United States Patent
Makohon et al.

(10) Patent No.: US 11,070,581 B1
(45) Date of Patent: Jul. 20, 2021

(54) ELIMINATING NETWORK SECURITY BLIND SPOTS

(71) Applicant: Wells Fargo Bank, N.A., San Francisco, CA (US)

(72) Inventors: Peter A. Makohon, Huntersville, NC (US); Robert I. Kirby, Charlotte, NC (US); Jonathan A. McNeill, Fleetwood, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 302 days.

(21) Appl. No.: 16/111,877

(22) Filed: Aug. 24, 2018

Related U.S. Application Data

(60) Provisional application No. 62/549,736, filed on Aug. 24, 2017.

(51) Int. Cl.
*H04L 29/06* (2006.01)
*H04L 12/24* (2006.01)

(52) U.S. Cl.
CPC .......... *H04L 63/1433* (2013.01); *H04L 41/14* (2013.01); *H04L 41/28* (2013.01); *H04L 63/1441* (2013.01); *H04L 63/20* (2013.01)

(58) Field of Classification Search
CPC ..... H04L 63/1433; H04L 41/14; H04L 63/20; H04L 41/28; H04L 63/1441
See application file for complete search history.

(56) References Cited

U.S. PATENT DOCUMENTS

| | | | | |
|---|---|---|---|---|
| 6,466,898 B1 * | 10/2002 | Chan | ...................... | G06F 30/33 703/17 |
| 7,506,047 B2 * | 3/2009 | Wiles, Jr. | ............ | G06F 11/3414 709/224 |
| 8,326,971 B2 * | 12/2012 | Dickerson | ........... | G06F 11/3495 709/224 |
| 8,584,226 B2 * | 11/2013 | Kudla | ................... | H04L 63/101 726/13 |
| 8,650,292 B2 * | 2/2014 | Ruiz | ................... | H04L 41/5038 709/224 |
| 8,887,285 B2 * | 11/2014 | Jordan | .................. | G06F 21/562 726/25 |
| 9,294,492 B1 * | 3/2016 | Martini | ................. | H04L 63/145 |
| 9,329,973 B2 * | 5/2016 | Bhuyan | ................ | G06F 21/566 |

(Continued)

FOREIGN PATENT DOCUMENTS

CN 102546624 7/2012
WO 2016043739 3/2016

*Primary Examiner* — J. Brant Murphy
(74) *Attorney, Agent, or Firm* — Walter Haverfield LLP; James J. Pingor

(57) ABSTRACT

The innovation disclosed and claimed herein, in one aspect thereof, comprises systems and methods of eliminating blind spots in a network system. The systems and methods generate synthetic transactions across a network system and capture at least part of the generated synthetic transactions. The systems and methods determine parts of the synthetic transactions that were not captured and generate a logical security map of the network system based on the captured synthetic transactions. The systems and methods determine at least one blind spot in the logical security map of the network system and determine a solution to eliminate the at least one blind spot. The systems and methods implement the solution for the network system to eliminate the blind spot.

16 Claims, 7 Drawing Sheets

(56) References Cited

U.S. PATENT DOCUMENTS

| | | | | |
|---|---|---|---|---|
| 9,386,034 | B2 * | 7/2016 | Cochenour | H04L 63/1416 |
| 9,390,268 | B1 * | 7/2016 | Martini | H04L 63/1441 |
| 9,461,968 | B2 * | 10/2016 | Chang | H04L 63/0263 |
| 9,483,742 | B1 * | 11/2016 | Ahmed | G06N 20/00 |
| 9,497,204 | B2 * | 11/2016 | Symons | G06N 20/00 |
| 10,270,808 | B1 * | 4/2019 | Sherif | G06Q 50/265 |
| 2002/0123875 | A1 * | 9/2002 | Roesner | G06F 30/33 |
| | | | | 703/17 |
| 2003/0055883 | A1 * | 3/2003 | Wiles, Jr. | H04L 67/02 |
| | | | | 709/203 |
| 2007/0192860 | A1 * | 8/2007 | Hiscock | G06F 21/55 |
| | | | | 726/23 |
| 2007/0300296 | A1 * | 12/2007 | Kudla | H04L 63/101 |
| | | | | 726/13 |
| 2008/0229149 | A1 * | 9/2008 | Penton | G06F 21/577 |
| | | | | 714/30 |
| 2009/0144409 | A1 * | 6/2009 | Dickerson | G06F 11/3495 |
| | | | | 709/224 |
| 2010/0161875 | A1 * | 6/2010 | Chang | G06F 9/45558 |
| | | | | 711/6 |
| 2012/0016983 | A1 * | 1/2012 | Ruiz | H04L 41/5038 |
| | | | | 709/224 |
| 2014/0359642 | A1 * | 12/2014 | Need | G06F 9/542 |
| | | | | 719/318 |
| 2015/0163200 | A1 * | 6/2015 | Chang | H04L 63/0227 |
| | | | | 726/1 |
| 2015/0172300 | A1 * | 6/2015 | Cochenour | H04L 63/1416 |
| | | | | 726/23 |
| 2016/0028854 | A1 * | 1/2016 | Leeb | H04W 24/06 |
| | | | | 709/203 |
| 2019/0164173 | A1 * | 5/2019 | Liu | G06N 20/00 |

* cited by examiner

ELIMINATING NETWORK SECURITY BLIND SPOTS

CROSS-REFERENCE TO RELATED APPLICATIONS

This application claims the benefit of U.S. Provisional Patent Application Ser. No. 62/549,736 filed Aug. 24, 2017, and entitled "ELIMINATING NETWORK SECURITY BLIND SPOTS", the entirety of which is expressly incorporated herein by reference.

BACKGROUND

Network security is increasingly important. Security assets are deployed on network systems to ensure malicious software, data packets, and/or traffic are detected for the network system before causing network interruptions or compromising important data. However, oftentimes, the security assets fail to protect the entirety of the network system. The security assets may not protect unpredictable blind spots in the network system that can lead to the susceptibilities in the network system that can be compromised. Further, it is difficult and dangerous to troubleshoot and detect blind spots through conventional real network traffic.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods for eliminating network security blind spots. A method includes generating synthetic transactions across a network system, wherein the synthetic transactions travel across the network system. The method also includes capturing at least part of the generated synthetic transactions. The method generates a logical security map of the network system based on the captured synthetic transactions. Further, the method generates solutions to eliminate blind spots based on the logical security map.

A system of the innovation can include a traffic generator that generates synthetic transactions across a network system. The system includes a capture component that captures at least part of the generated synthetic transactions and a map component that generates a logical security map of the network system based on the captured synthetic transactions. The system includes an implementation component that determines a solution to eliminate the at least one blind spot, and implements the solution for the network system.

A computer readable medium of the innovation has instructions to generate synthetic transactions across a network system, wherein the synthetic transactions travel across the network system and capture at least part of the generated synthetic transactions. The computer readable medium has instructions to determine parts of the synthetic transactions that were not captured and generate a logical security map of the network system based on the captured synthetic transactions. The computer readable medium has instructions to determine at least one blind spot in the logical security map of the network system and determine a solution to eliminate the at least one blind spot. The computer readable medium has instructions to implement the solution for the network system.

In aspects, the subject innovation provides substantial benefits in terms of network diagnostics and security. One advantage resides in better understanding of the deficiencies of network security assets. Another advantage resides in testing the network security with network traffic that is known and unable to cause damage to the network system.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
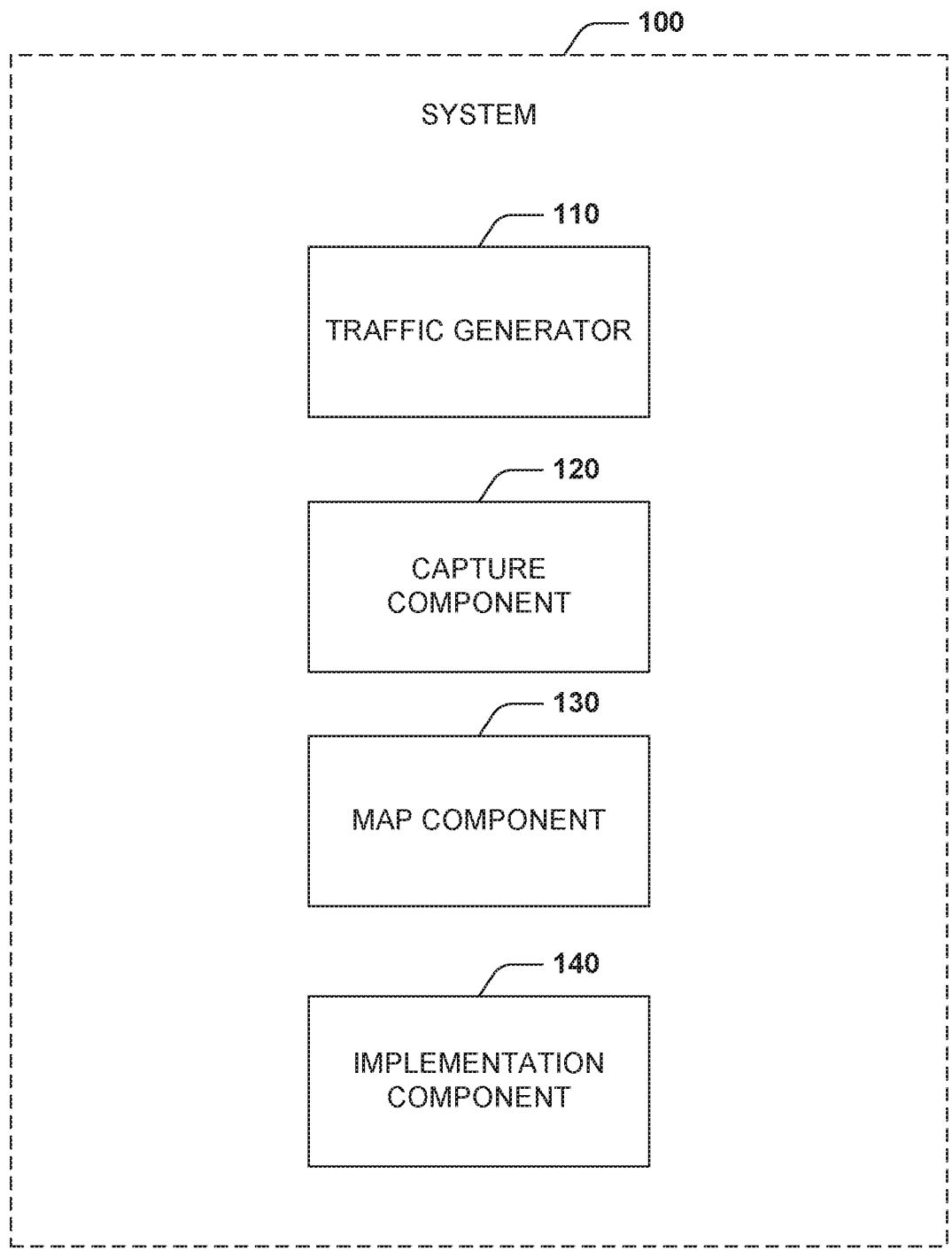
FIG. 1 illustrates an example component diagram of a system for determining network system blind spots.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for determining network system blind spots in security assets/protocols implemented on a network system. The system 100 includes a traffic generator 110. The traffic generator 110 can generate synthetic transactions to test the network system. In some embodiments, the synthetic transactions travel across the network system. In some embodiments, the synthetic transactions replicate usual traffic expected for the network system. The synthetic transactions are known by a technician and are designed such that the synthetic transactions cannot damage the network system. The traffic generator 110 can replicate network traffic between nodes on the network system. The traffic generator 110 can generate traffic that can appear to be from outside the network system to specific nodes or parts of the network system.

The network system can be a mobile network, wired LAN, wireless LAN, an internet network, or the like to transmit communications. The network system can be a corporation wide network that provides online services and/or access to corporate sites and/or information. In some embodiments, the network system is made up of network segments. The network system can be divided into a series of smaller networks (e.g. sub-networks, virtual networks, ad hoc networks, and/or the like) that can provide access to different services, devices, and/or functionality. The network system can control access to different network segments such that only part of the network may be available to certain users, devices, and/or applications.

The system 100 includes a capture component 120. The capture component 120 can capture the generated synthetic transactions at various locations of the network system. The capture component 120 resides on the network system. The capture component 120 can detect the synthetic transactions on the network system. In some embodiments, the capture component 120 is made of security assets residing on the network system. The security assets are hardware or software implementations to detect malicious network traffic. The capture component 120 can use the security assets to detect the synthetic transactions at different parts or nodes on the network system. In some embodiments, the capture component 120 captures part of the synthetic transactions and does not capture other synthetic transactions.

The system 100 includes a map component 130. The map component 130 generates a logical security map of the network system based on the captured synthetic transactions from the capture component 120. The map component 130 determines parts of the network where the synthetic transactions were detected and parts of the network where the synthetic transactions were not detected. The map component 130 can indicate blind spots in the network system where synthetic transactions were not detected where the transactions were sent and therefore expected to be detected.

The system 100 includes an implementation component 140. The implementation component 140 determines a solution to eliminate blind spots in the network system and implements the solution for the network system. In some embodiments, the implementation component 140 can prioritize acquisition of security assets to eliminate a blind spot. In other embodiments, the implementation component 140 can restructure and/or reconfigure existing security assets of the network system to eliminate a blind spot.

Figure 2:
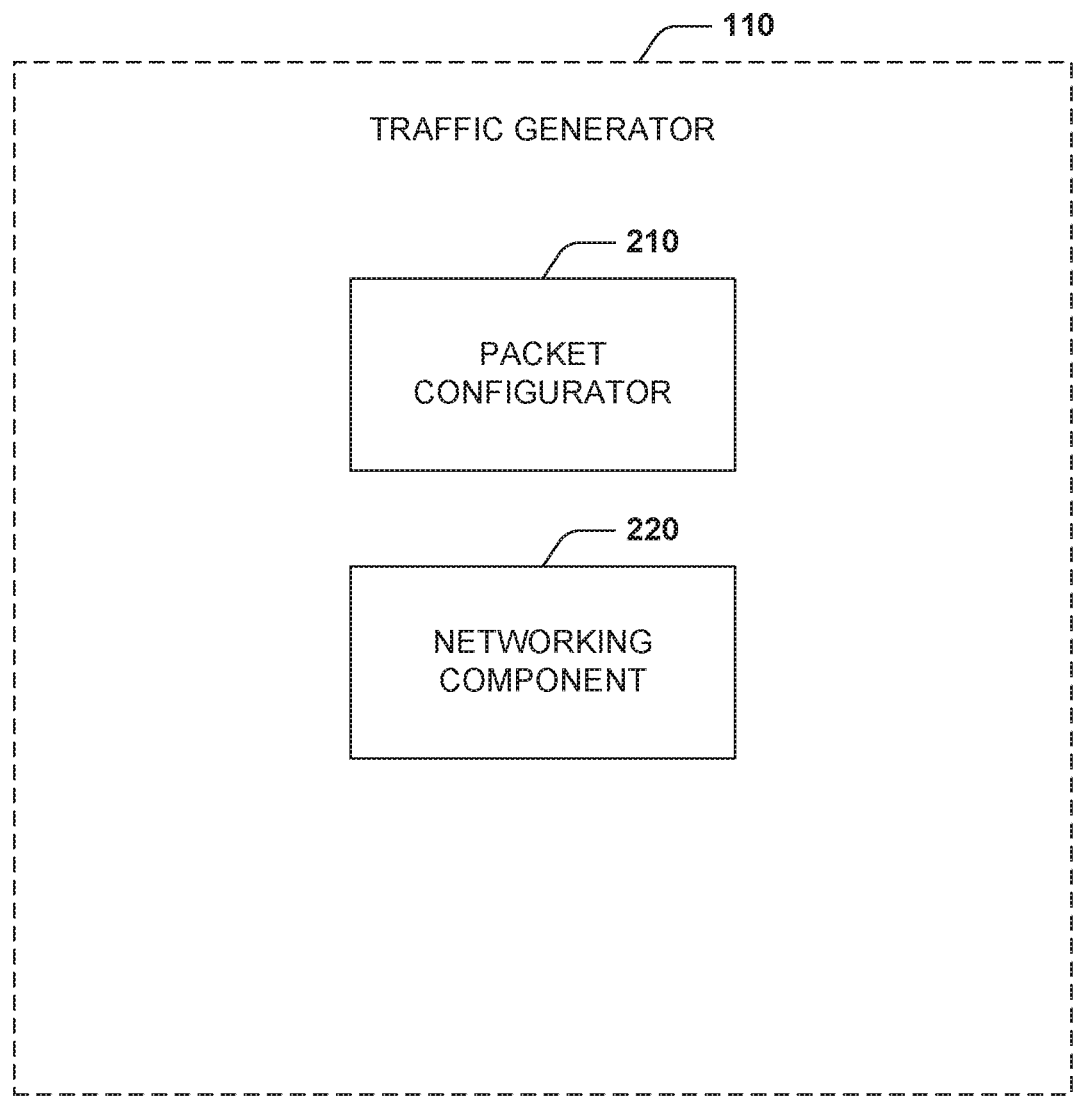
FIG. 2 illustrates an example component diagram of a traffic generator.

FIG. 2 illustrates a detailed component diagram of the traffic generator 110. The traffic generator 110 includes a packet configurator 210. The packet configurator 210 generates data packets between a plurality of nodes residing on the network system that mimic a financial transaction. The packet configurator 210 can design the data packets with benign data. In some embodiments, the data packets include a source address field and a destination address field that are recorded or otherwise known to the network system. The packet configurator 210 can generate a packet to be sent to each node in the network system such that the entire network system may be tested by the capture component 120 and mapped by the map component 130.

The traffic generator 110 includes a networking component 220. The networking component 220 sends the synthetic transactions and/or the data packets through the network system to simulate conventional traffic on the network system. In some embodiments, the networking component 220 can access or reside on a corporation wide network that provides online services and/or access to corporate sites and/or information.

Figure 3:
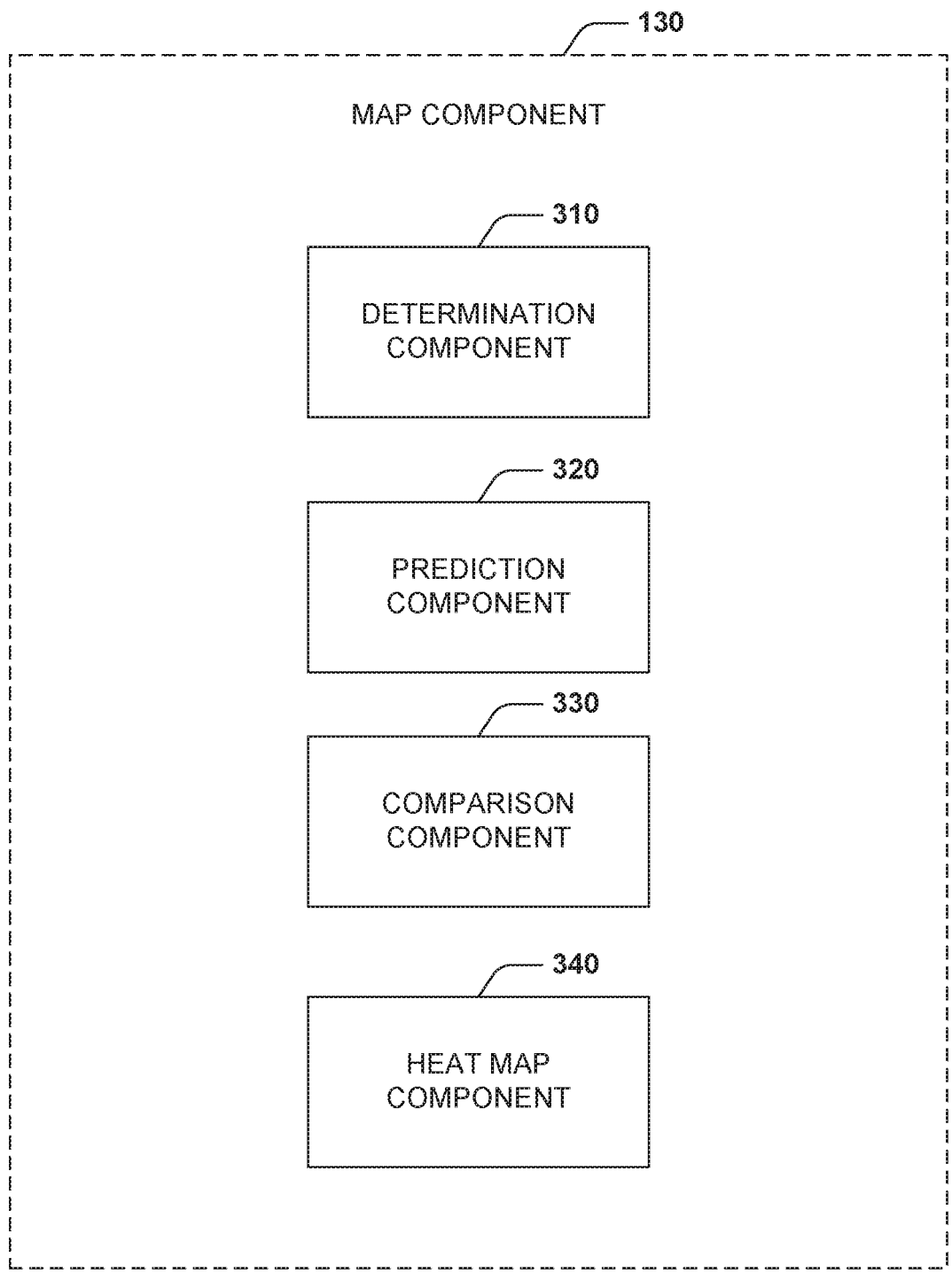
FIG. 3 illustrates an example component diagram of a map component.

FIG. 3 illustrates a component diagram of the map component 130. The map component 130 includes a determination component 310 that determines the synthetic transactions that were not captured. In some embodiments, the determination component 310 can receive the total synthetic transactions sent through the network system from the traffic generator 110. The determination component 310 can receive the captured synthetic transactions from the capture component 120. The determination component 310 evaluates the differences between the total synthetic transactions and the captured transactions. The map component 130 generates a logical security map based on the evaluated differences.

In another embodiment, the map component 130 includes a prediction component 320 that generates an expected security map of the network system. The expected security map can be determined by an evaluation of the security assets to determine expected captured synthetic transactions or traffic. A comparison component 330 compares the expected security map to the generated logical security map to determine blind spots. For example, synthetic transactions directed to Node A of the network system were expected to be captured based on the expected security map. However, it was observed by the capture component 120 that the synthetic transactions were not detected and therefore the logical security map shows there was no captured synthetic transactions. The comparison component 330 compares the expected security map to the logical security map and determines the places where expected captures are missing as blind spots.

In some embodiments, the map component 130 may include a heat map component 340 that generates a heat map of the network system based on the captured synthetic transactions. The heat map component 340 can generate a heat map that graphically depicts severity of blind spots. For example, a node in which a lot of the synthetic transactions passed through uncaptured can be depicted in the heat map as a highlighted or more intensely hued color while generally safe nodes where all transactions were captured can be depicted in a more muted color. The heat map provides the system 100, the implementation component 140, and/or a technician with a visual feedback to facilitate prioritizing elimination of more critical blind spots over less critical blind spots.

Figure 4:
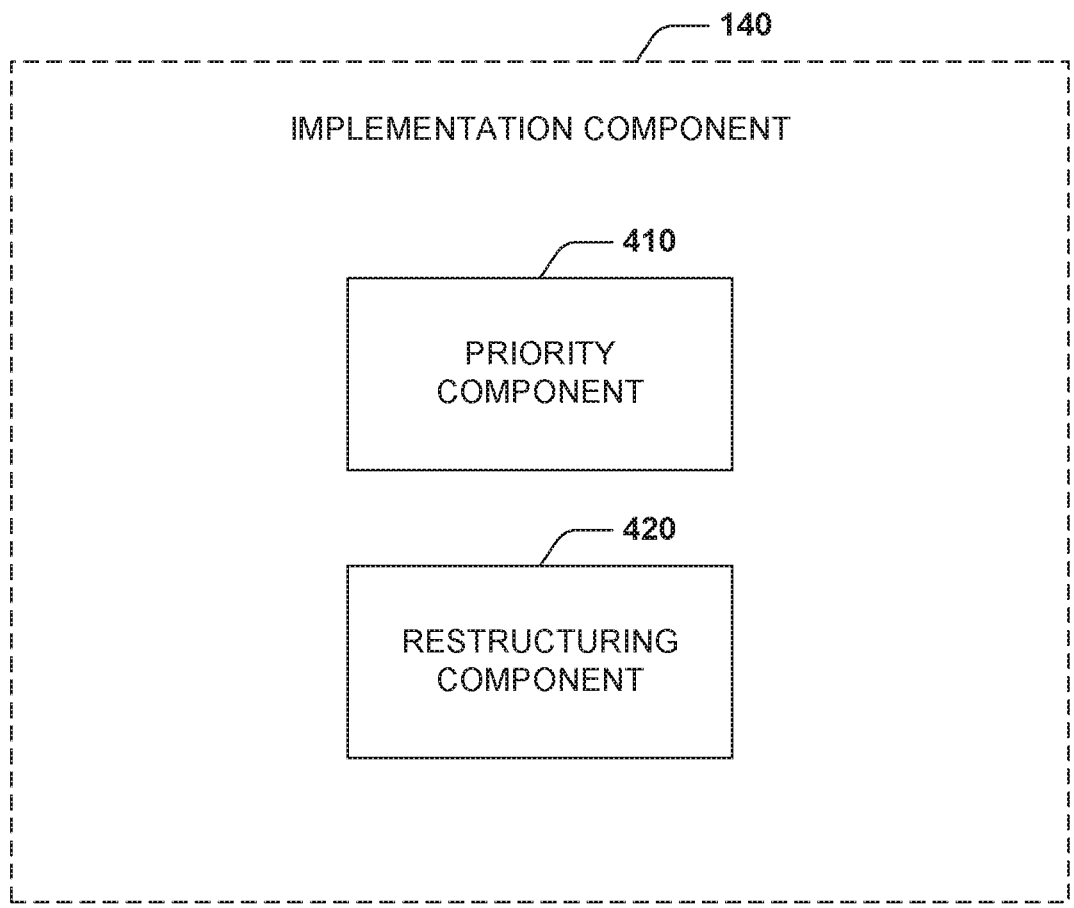
FIG. 4 illustrates an example component diagram of an implementation component.

FIG. 4 illustrates a component diagram of the implementation component 140. The implementation component 140 determines a solution to eliminate the at least one blind spot. The implementation includes a priority component 410. The priority component 410 prioritizes acquisition of at least one security asset to be deployed onto the network system that eliminates the at least one blind spot. In some embodiments, the priority component 410 determines a recommendation to a technician for acquiring additional security assets.

The implementation component 140 can include a restructuring component 420. The restructuring component 420 reconfigures existing security assets that are deployed on the network system. For example, the restructuring component 420 can determine a redundancy of security assets at one part of the network and recommend a redundant security asset to be deployed to a part of the network system having a blind spot. In some embodiments, the restructuring component 420 can determine a new configuration of an existing security asset to eliminate a blind spot. For example, a security asset that is not receiving many synthetic transactions or network traffic may be expanded in scope to include parts of the network system having a blind spot.

Figure 5:
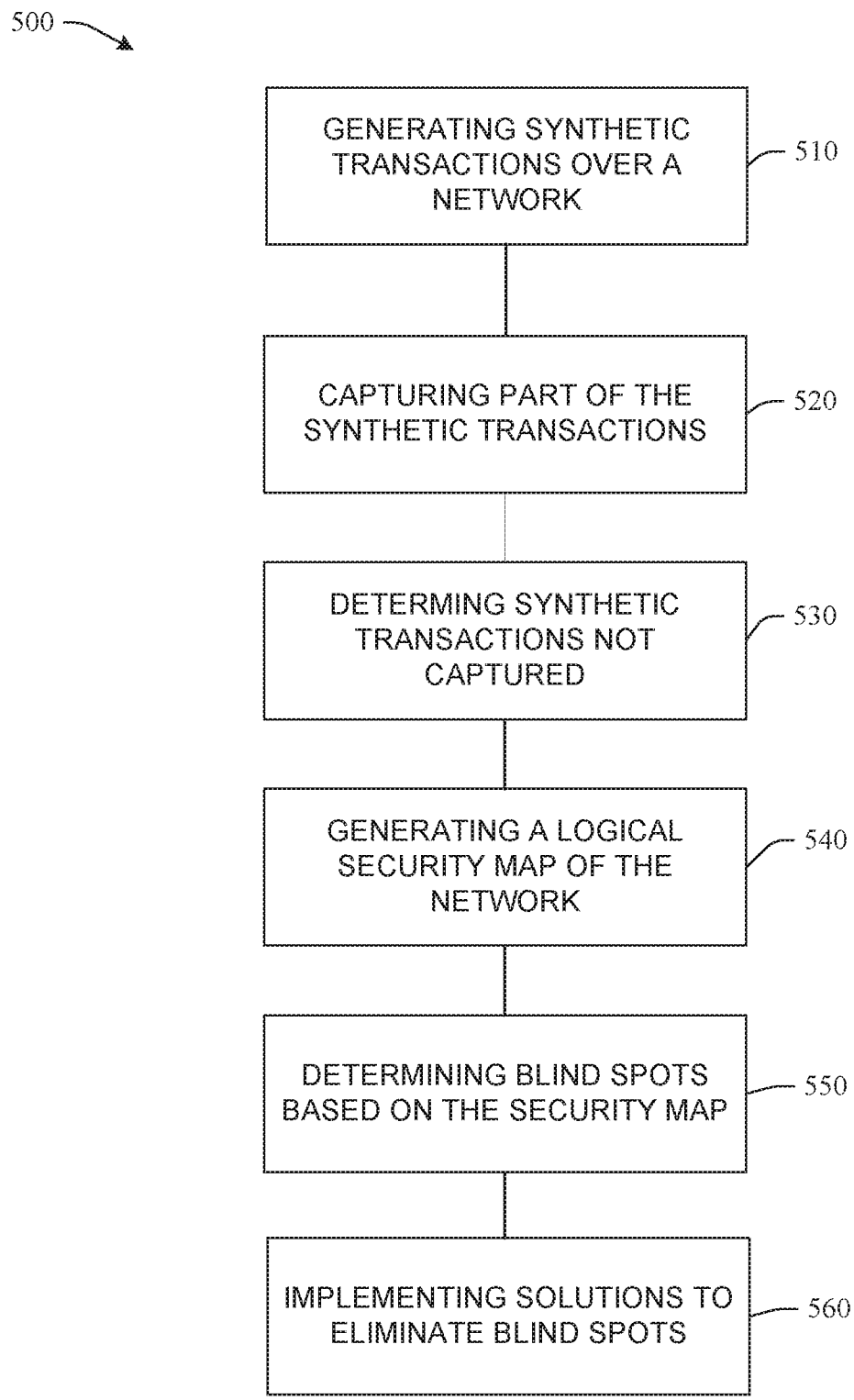
FIG. 5 illustrates a method for determining network blind spots.

With reference to FIG. 5, example methods 500 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 500 are described in conjunction with a specific example is for explanation purposes.

FIG. 5 illustrates a method 500 for determining network system blind spots in security assets/protocols implemented on a network system. At 510, synthetic transactions are generated across a network system. For example, a network system is to be tested for blind spots. Synthetic transactions are generated to be directed across the entire (or substantially the entire) network system for a complete test for blind spots.

At 520, the generated synthetic transactions are captured at the network system level. The synthetic transactions may be captured using hardware security assets, software security tools, and/or a combination of the two. At 530, synthetic transactions that were not captured on the network system are determined. At 540, a logical security map of the network system based on the captured and not captured synthetic transactions is generated. The logical security map can show where the synthetic transactions were and were not captured.

At 550, blind spots in the logical security map of the network system are determined. The blind spots are parts in the network system where synthetic transactions were sent but were not detected during the capture 520. At 560, solutions to eliminate the blind spots in the network system are determined. The solutions can be acquisition of security assets to fill the blind spots or restructuring or reconfiguring of existing security assets.

Figure 6:
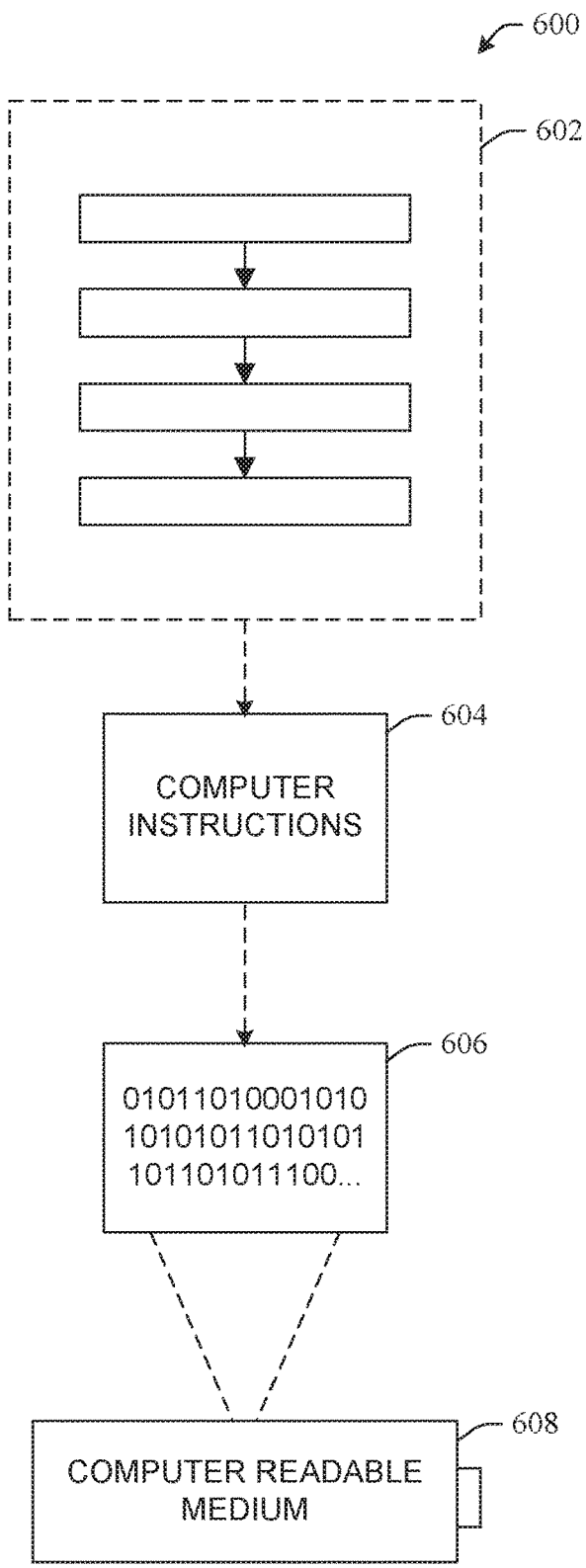
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
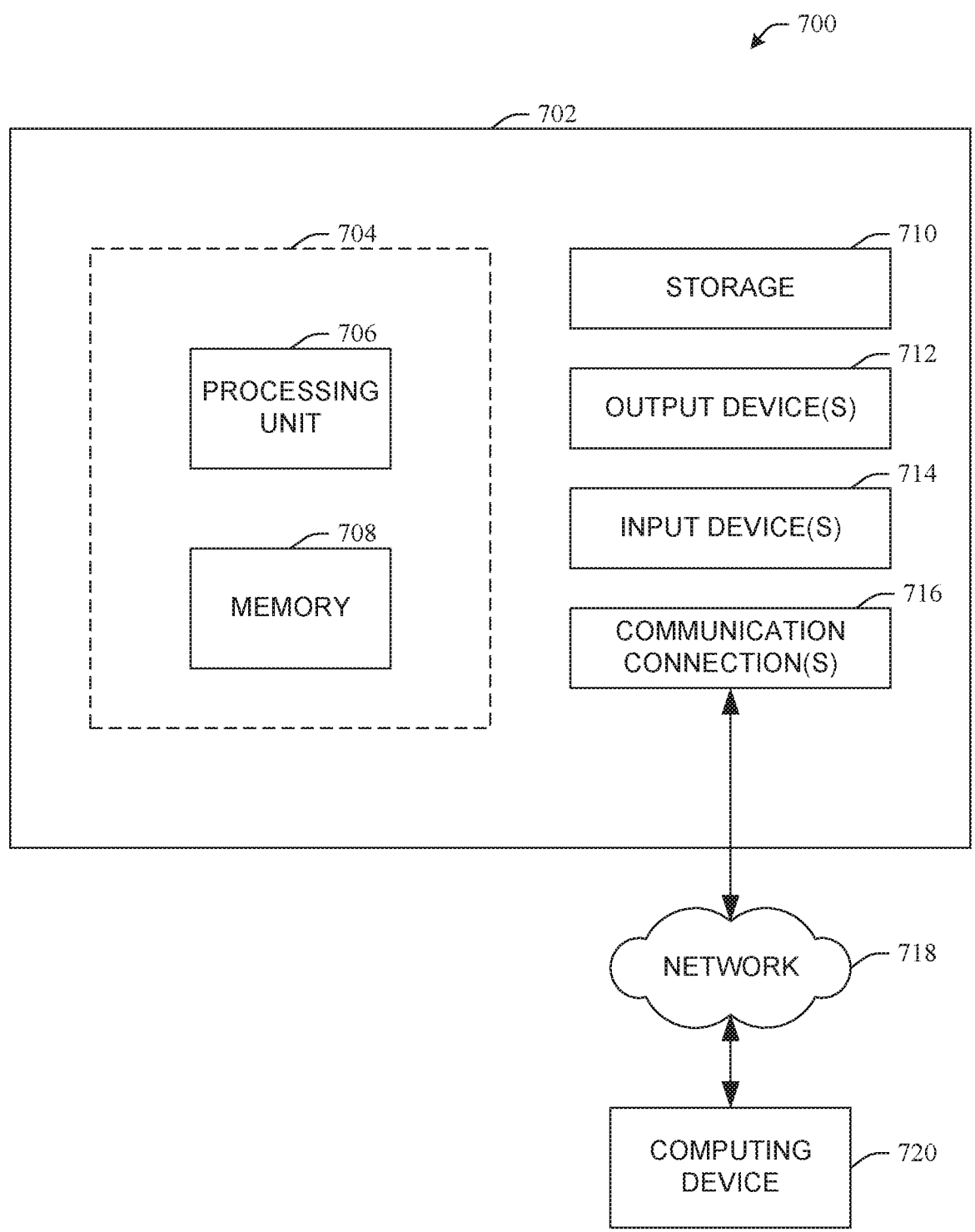
FIG. 7 illustrates a computing environment where one or more of the provisions set forth herein can be implemented, according to some embodiments.

With reference to FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be accessed in memory 708 for execution by processing unit 706, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   generating synthetic transactions for a network system, wherein the synthetic transactions travel across the network system, wherein the synthetic transactions imitate financial transactions that are performed over the network system, and wherein the network system is an enterprise network system employed by a financial institution;
   capturing at least part of the synthetic transactions; and
   generating a logical security map of the network system based on the at least part of the synthetic transactions.

2. The method of claim 1, wherein generating the logical security map comprises:
   determining other parts of the synthetic transactions that were not captured; and
   determining at least one blind spot in the logical security map of the network system.

3. The method of claim 2, comprising:
   determining a solution to eliminate the at least one blind spot; and
   implementing the solution for the network system.

4. The method of claim 3, wherein the solution comprises:
   prioritizing acquisition and implementation of at least one security asset to be deployed onto the network system to eliminate the at least one blind spot.

5. The method of claim 3, wherein the solution comprises:
   reconfiguring at least one existing security asset that is deployed on the network system to a different part of the network system to eliminate the at least one blind spot.

6. The method of claim 2, wherein determining the at least one blind spot, comprises:
   generating an expected security map of the network system;
   comparing the expected security map to the logical security map to determine the at least one blind spot.

7. The method of claim 1, wherein generating the logical security map comprises:
   generating a heat map of the network system.

8. The method of claim 1, wherein generating the synthetic transactions comprises:
   generating data packets between a plurality of nodes residing on the network system that mimic a financial transaction, wherein the data packets include a source address and a destination address that are known to the network system.

9. A system, comprising:
   one or more hardware processors having one or more processor-executable instructions, the one or more processor-executable instructions comprising:
      generate synthetic transactions for a network system, wherein the synthetic transactions travel across the network system;
      capture at least part of the generated synthetic transactions; and
      generate a logical security map of the network system based on the at least part of synthetic transactions, wherein generating the logical security map comprises:
         generating a heat map of the network system based on the captured synthetic transactions.

10. The system of claim 9, wherein generating the map comprises:
  determine other parts of the synthetic transactions that were not captured; and
  determine at least one blind spot in the logical security map of the network system based on the synthetic transactions not captured.

11. The system of claim 10, comprising:
  determine a solution to eliminate the at least one blind spot; and
  implement the solution for the network system.

12. The system of claim 11, wherein determining the solution comprises:
  prioritize acquisition of at least one security asset to be deployed onto the network system to eliminate the at least one blind spot.

13. The system of claim 11, wherein determining the solution comprises:
  reconfigure at least one existing security asset that is deployed on the network system to a different part of the network system to eliminate the at least one blind spot.

14. The system of claim 10, wherein generating the map comprises:
  generate an expected security map of the network system; and
  compare the expected security map to the logical security map to determine the at least one blind spot.

15. The system of claim 9, comprising:
  generate data packets between a plurality of nodes residing on the network system that mimic a financial transaction, wherein the data packets include a source address and a destination address that are known to the network system.

16. A non-transitory computer readable medium having instructions to control one or more processors configured to:
  send synthetic transactions across a network system;
  capture at least part of the synthetic transactions;
  determine other parts of the synthetic transactions that were not captured;
  generate a logical security map of the network system based on the at least part of the synthetic transactions captured;
  determine at least one blind spot in the logical security map of the network system;
  determine a solution to eliminate the at least one blind spot; and
  implement the solution for the network system, wherein implementing the solution comprises:
    reconfigure at least one existing security asset that is deployed on the network system to a different part of the network system to eliminate the at least one blind spot.

* * * * *